United States Patent
Au

(10) Patent No.: US 8,124,558 B2
(45) Date of Patent: Feb. 28, 2012

(54) CATALYZED BOROHYDRIDES FOR HYDROGEN STORAGE

(75) Inventor: Ming Au, Augusta, GA (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 851 days.

(21) Appl. No.: 11/130,750

(22) Filed: May 17, 2005

(65) Prior Publication Data
US 2006/0046930 A1 Mar. 2, 2006

Related U.S. Application Data

(60) Provisional application No. 60/605,177, filed on Aug. 27, 2004.

(51) Int. Cl.
- B01J 23/00 (2006.01)
- B01J 20/00 (2006.01)
- C01B 6/24 (2006.01)
- C01B 3/02 (2006.01)

(52) U.S. Cl. ...... 502/300; 502/400; 423/544; 423/648.1

(58) Field of Classification Search ............ 423/644, 423/648.1; 502/300, 400
See application file for complete search history.

(56) References Cited

U.S. PATENT DOCUMENTS

| | | | |
|---|---|---|---|
| 4,193,978 A * | 3/1980 | Muller et al. ............ 423/648.1 | |
| 6,670,444 B2 | 12/2003 | Amendola et al. | |
| 6,683,025 B2 | 1/2004 | Amendola et al. | |
| 6,706,909 B1 | 3/2004 | Snover et al. | |
| 6,737,184 B2 | 5/2004 | Rusta-Selleby et al. | |
| 6,746,496 B1 | 6/2004 | Kravitz et al. | |
| 7,094,387 B2 | 8/2006 | Zidan | |
| 2004/0052722 A1 | 3/2004 | Jorgensen et al. | |
| 2004/0065171 A1 | 4/2004 | Hearley et al. | |
| 2004/0071630 A1 | 4/2004 | Jorgensen | |
| 2004/0105805 A1 | 6/2004 | Zidan | |
| 2004/0120889 A1 | 6/2004 | Shah et al. | |
| 2005/0191232 A1* | 9/2005 | Vajo et al. ............... 423/648.1 |
| 2005/0230659 A1* | 10/2005 | Hampden-Smith et al. .. 252/189 |
| 2006/0046930 A1* | 3/2006 | Au ............................ 502/400 |
| 2006/0194695 A1* | 8/2006 | Au ............................ 502/400 |

OTHER PUBLICATIONS

Zuttel et al. "Hydrogen storage properties of LiBH4" Journal of Alloys and Compounds 356-357 (2003) pp. 515-520.*
Schlapbach et al. "Hydrogen-storage materials for mobile applications" Nature 414 (2001) pp. 353-358.*
Zuttel et al. "LiBH4 as new hydrogen storage material" Journal of Power Sources 118 (2003) 1-7.*
Vajo, John J. & Skeith, Sky L., "Reversible Storage of Hydrogen in Destabilized LiBH$_4$", J of Physical Chemistry Letters, 2005, 109, 3719-3722.
Zuttel et al, "Hydrogen storage properties of LiBH", J. of Alloys and Compounds, 356-357 (2003) 515-520.

* cited by examiner

Primary Examiner — Jerry Lorengo
Assistant Examiner — Jennifer Smith
(74) Attorney, Agent, or Firm — J. Bennett Mullinax, LLC

(57) ABSTRACT

A hydrogen storage material and process is provided in which alkali borohydride materials are created which contain effective amounts of catalyst(s) which include transition metal oxides, halides, and chlorides of titanium, zirconium, tin, and combinations of the various catalysts. When the catalysts are added to an alkali borodydride such as a lithium borohydride, the initial hydrogen release point of the resulting mixture is substantially lowered. Additionally, the hydrogen storage material may be rehydrided with weight percent values of hydrogen at least about 9 percent.

9 Claims, 5 Drawing Sheets

Dehydriding of the catalyzed borohydrides

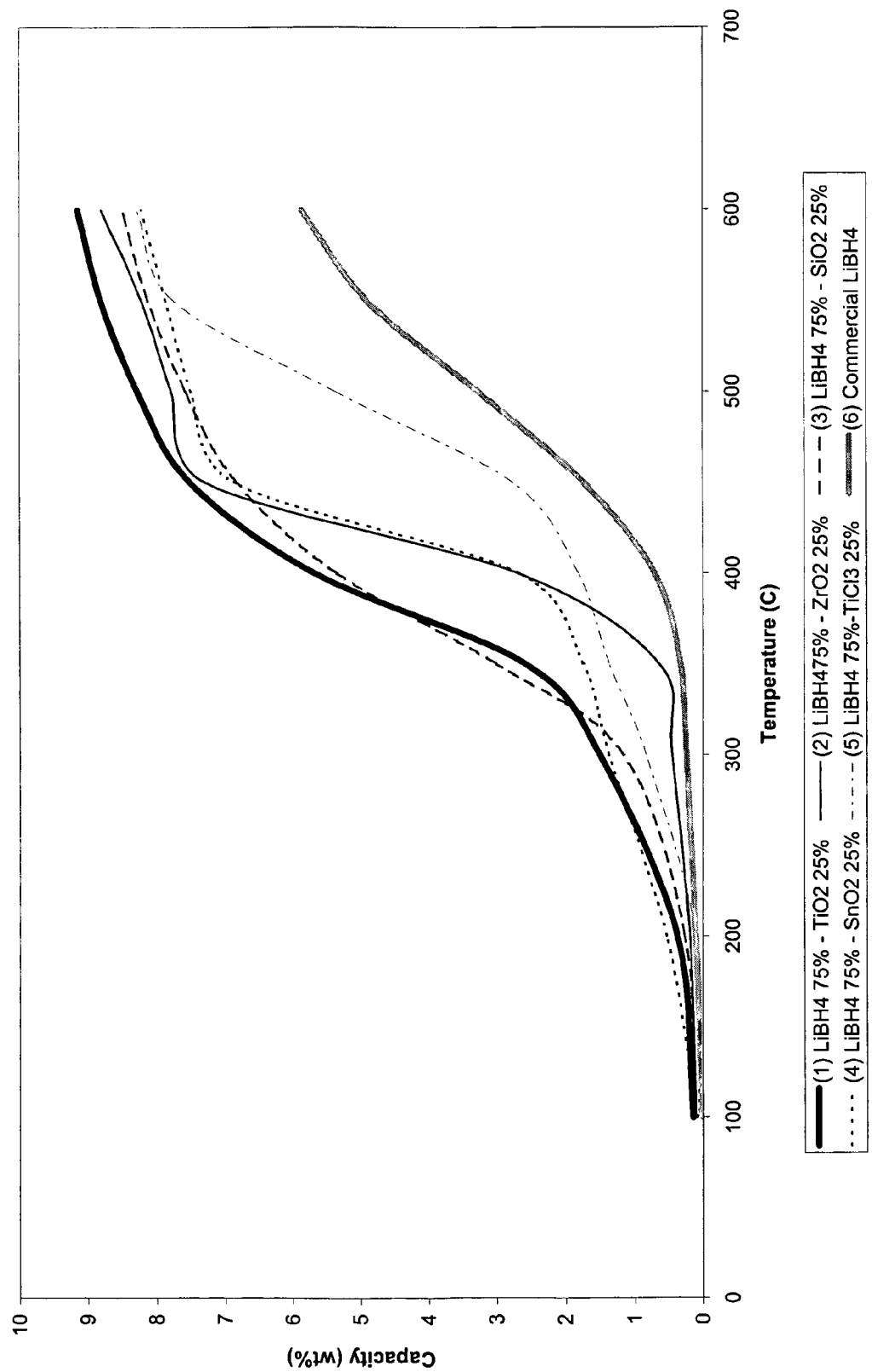

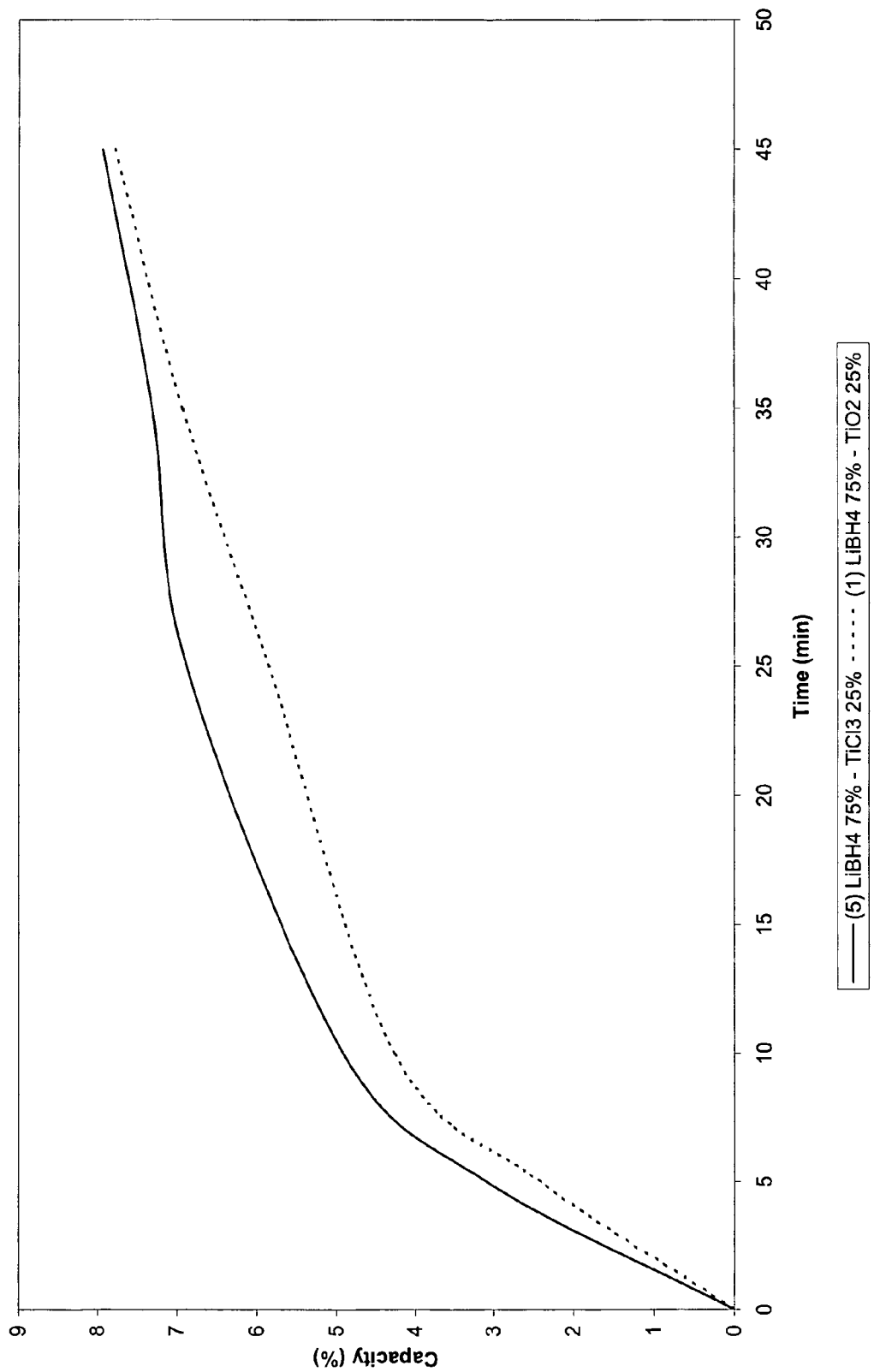
Fig.2 Rehydriding of the catalyzed borohydrides at 600C and 10 MPa

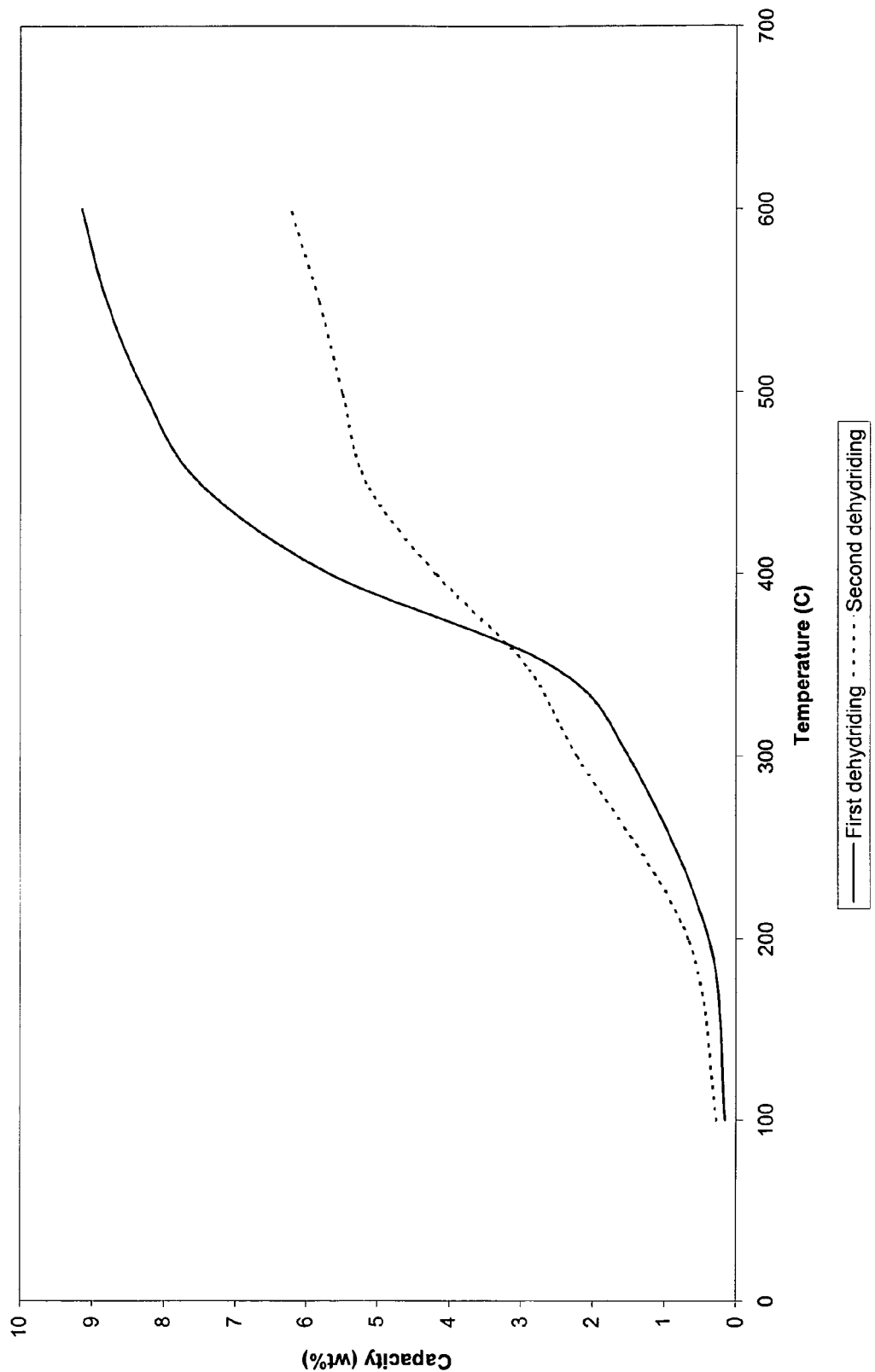

Fig.4 Isothermal dehydriding of $LiBH_4$ 75% - $TiO_2$ 25%
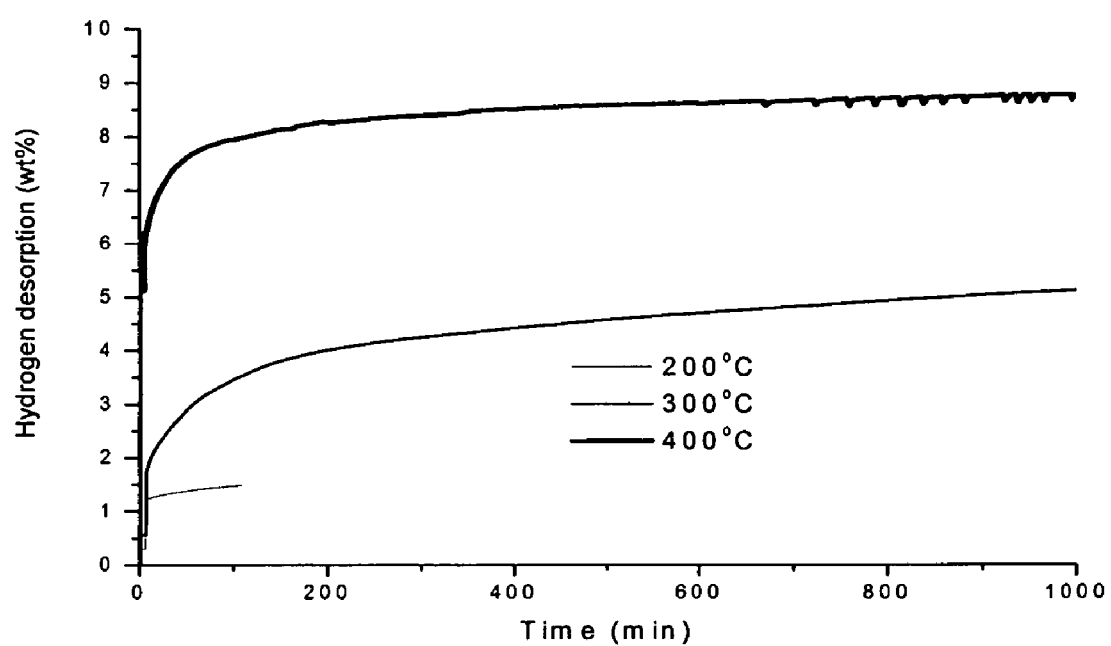

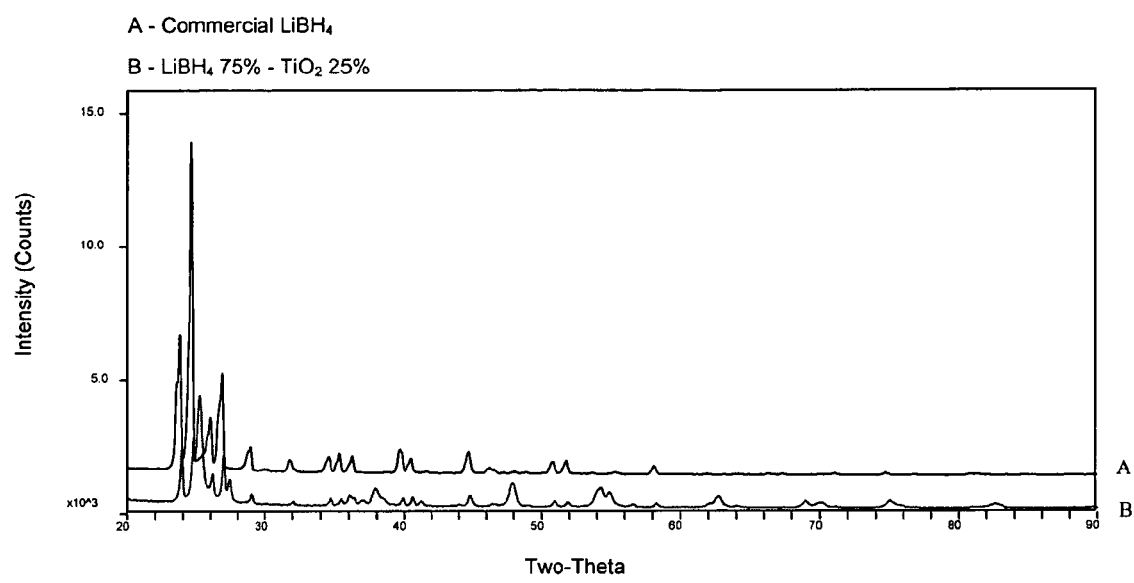
Fig. 5 X-ray diffraction spectra of the commercial and catalyzed borohydrides

CATALYZED BOROHYDRIDES FOR HYDROGEN STORAGE

RELATED APPLICATIONS

This application claims the benefit of U.S. Provisional Application 60/605,177, filed on Aug. 27, 2004, and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed towards a hydrogen storage material and process of using the hydrogen storage material in which metal borohydrides may be catalyzed so as to achieve a lower hydrogen storage release start point of about 200° C. Further, the present invention is directed to the catalyzed borohydrides which may reversibly absorb and desorb hydrogen. A further aspect of the invention is directed to a process of incorporating catalysts into a metal borohydride so as to achieve novel borohydride compositions having improved hydrogen release kinetics along with an ability to reversibly absorb and desorb hydrogen.

BACKGROUND OF THE INVENTION

This invention relates to the use of borohydrides in hydrogen storage and release technologies. Borohydrides such as $LiBH_4$ can be used for hydrogen storage and energy systems making use of stored hydrogen. Borohydrides contain a large amount of hydrogen within their molecular structure. For example, $LiBH_4$ contains 18 wt % hydrogen, an amount higher than any other known hydrogen storage material. Accordingly, borohydrides have great potential to be developed as hydrogen storage media.

Unfortunately, borohydrides release hydrogen at very high temperatures, with temperatures usually exceeding a melting point of the borohydrides. For example, commercially available $LiBH_4$ releases hydrogen above 400° C. In addition, the hydrogen release mechanism is typically irreversible for commercially available $LiBH_4$ in that the borohydride cannot be rehydrided.

It is known to use various borohydrides for specialized applications requiring a hydrogen storage material. For instance, U.S. Pat. No. 6,737,184 assigned to Hydrogenics Corporation, and which is incorporated herein by reference, discloses one release mechanism using $LiBH_4$ in which a solvent such as water is used to bring about the release of stored hydrogen. However, once released, the $LiBH_4$ cannot be easily rehydrided.

Similar aqueous based release reactions for borohydrides may also be seen in reference to U.S. Pat. Nos. 6,670,444; 6,683,025; and 6,706,909 all assigned to Millennium Cell and which are incorporated herein by reference. The cited references are all directed to aqueous-based reactions for releasing hydrogen from a borohydride. There is no discussion within the references of catalysts or material handling techniques that allow the reversible release of hydrogen from a metal borohydride containing solid compound.

It is also known in the art that borohydrides may release hydrogen through a thermal decomposition process. For instance, in U.S. Pat. No. 4,193,978 assigned to Comphenie Francaise de Raffinage and which is incorporated herein by reference, lithium borohydride is described as a hydrogen storage material which releases hydrogen during a thermal decomposition process. The reference stated that aluminum may be added to the lithium borohydride to lower the reconstitution temperature and to increase the hydrogen capacity of the material. There is no discussion of catalysts or other materials or techniques designed to bring about a lower hydrogen release point temperature.

It has been reported in the article, "Hydrogen Storage Properties of $LiBH_4$", Journal of Alloys & Compounds, 356-357 (2003) 515-520 by Zuttlel et al and which is incorporated herein by reference, that $LiBH_4$ may include a low temperature structure of an orthorhombic, space group having a hydrogen desorption value reportedly occurring at approximately 200° C. in the presence of $SiO_2$. However, an ability to rehydride the lithium borohydride and the use of additives other than the $SiO_2$ in reducing the dehydriding temperature and isothermal dehydriding properties are not reported.

Currently, the art recognizes that borohydrides, when subjected to high temperatures, may decompose and release hydrogen at a point near or in excess of the borohydride's melting point. Alternatively, borohydrides can also be used through a hydrolysis process to provide a source of hydrogen. However, there remains room for improvement and variation within the art directed to the use of borohydrides in hydrogen storage applications.

SUMMARY OF THE INVENTION

It is one aspect of at least one of the present embodiments to provide for a mixture of a borohydride and an effective amount of a catalyst which reduces the temperature at which stored hydrogen gas is released from the borohydride mixture.

It is an additional aspect of at least one of the present embodiments of the invention to provide for an effective amount of a catalyst which, when added to a borohydride mixture, enables the resulting mixture to release hydrogen gas and to subsequently be rehydrided under conditions of temperature and pressure.

It is a further aspect of at least one of the present embodiments of the invention to provide for a hydrogen storage material comprising a mixture of an alkali borohydride with an effective amount of a catalyst selected from the group consisting of $TiO_2$, $ZrO_2$, $SnO_2$, $TiCl_3$, $SiO_2$, transition metal oxides, halides, and combinations thereof.

It is a further aspect of at least one of the present embodiments of the invention to provide for a hydrogen storage material comprising a mixture of a borohydride, such as $LiBH_4$, with an effective amount of a catalyst selected from the group consisting of $TiO_2$, $ZrO_2$, $SnO_2$, $TiCl_3$, $SiO_2$, transition metal oxides, halides, and combinations thereof.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 1 is a graph showing the dehydriding characteristics of the indicated catalyzed borohydrides and accompanying control $LiBH_4$.

FIG. 2 is a graph showing the rehydriding capability of the catalyzed borohydrides at 600° C. and 10 MPa.

FIG. 3 is a graph setting forth the first and second cycle hydrogen release characteristics of $LiBH_4$ 75%-$TiO_2$ 25% at the indicated temperatures.

FIG. 4 is a graph setting forth desorption data for $LiBH_4$ 75%-$TiO_2$ 25% at respective temperatures of 400° C., 300° C., and 200° C.

FIG. 5 is an x-ray diffraction spectra setting forth that the $LiBH_4$ 75%-$TiO_2$ 25% has a unique crystal structure in comparison to a sample of $LiBH_4$.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

In accordance with the present invention, it has been found that borohydrides such as alkali borohydrides may be catalyzed with effective amounts of various oxides and chlorides of titanium, zirconium, tin along with transition metal oxides and other metal and non-metal oxides, halides, and combinations of catalysts so as to reduce the temperature release point for hydrogen. Additionally, the incorporation of effective amounts of catalysts in a mixture with the borohydrides has been found to permit the rehydriding of hydrogen into the mixture material under conditions of elevated temperatures and pressures.

As seen in reference to Table 1, the indicated weight percent of lithium borohydride was mixed with a 25 wt % of the indicated oxide or chloride of Ti, Si, Zr, and/or Sn. The indicated amounts of the resulting compositions were subjected to a ball milling process using three 11 mm diameter tungsten carbide balls in conjunction with a Fritsch ball mill apparatus. Samples of lithium borohydrides dried in an inert argon atmosphere were transferred inside the argon glovebox to two 45 ml grinding jars of the Fritsch ball mill apparatus, which were then sealed for protection during transfer to the Fritsch ball mill apparatus. At all times during the ball milling process, the borohydride and respective catalysts were maintained in an inert argon atmosphere. The ball mill apparatus was operated at 600 rpms. The ball milling times, as indicated, extended up to 20 hours using a cycle of 1 hour run time followed by a half hour of rest. The ball milling apparatus was run at ambient temperatures of 25° C.

Following the ball milling process, mixture samples ranging from approximately 0.250 grams to approximately 0.500 grams were evaluated in a Sieverts volumetric apparatus using a Temperature Programmed Desorption (TPD) from ambient temperature to 600° C. in 100° C. increments. The desorption conditions included a backpressure of $P_0$=5.4 mbar. Each target temperature was held for 10 minutes with a heating rate between target hold times of 5° C./min.

The results of the hydrogen desorption are set forth in FIG. 1 as samples 1-5 corresponding to Table 1 along with the appropriate control of commercially available $LiBH_4$ (100%) (Sample 6).

Following the hydrogen desorption, the desorbing material was rehydrided at 600° C. and 10 MPa of hydrogen for 45 minutes. As indicated in FIG. 2, the percent of hydrogen absorbed for the indicated materials is reflected on the Y axis.

As seen in FIG. 3, the sample of $LiBH_4$ 75%-$TiO_2$ 25% exhibits reversible hydrogen cycling characteristics as indicated by the capacity in weight percent of the material in a first dehydriding and a second dehydriding cycle.

As indicated by the data set forth below, the catalyzed borohydride compounds exhibit a hydrogen release initiation temperature which is reduced from 400° C. to 200° C. Additionally, the catalyzed borohydrides have shown a reversible capacity of about 6 wt % to about 9 wt % hydrogen. However, as the catalyst amounts and ball milling processes are optimized, it is envisioned that cycles of rehydrating and dehydrating will result in the reversible release of even greater weight percent amounts of hydrogen. The ability to rehydride borohydrides at the demonstrated temperatures and pressures represents a significant improvement and advancement within the art. The reversible capacity for hydrogen storage, when combined with the demonstrated ability of reduced temperature release kinetics, are significant advancements within the area of hydrogen storage materials in particular for borohydrides.

TABLE 1

| Sample | Composition % | Weight (g) | Balls (φmm/#) | Speed (rpm) | Milling Time (h) | Milling Time run/rest/cy | Temp (C. °) | Atmosphere |
|---|---|---|---|---|---|---|---|---|
| 1 | 75 wt % $LiBH_4$ + 25 wt % $TiO_2$ | 1.00 | 11/3 | 600 | 20 | (1 × 0.5 × 20) | 25 | Ar |
| 2 | 75 wt % $LiBH_4$ + 25 wt % $ZrO_2$ | 1.00 | 11/3 | 600 | 20 | (1 × 0.5 × 20) | 25 | Ar |
| 3 | 75 wt % $LiBH_4$ + 25 wt % $SiO_2$ | 2.00 | 11/3 | 600 | 20 | (1 × 0.5 × 20) | 25 | Ar |
| 4 | 75 wt % $LiBH_4$ + 25 wt % $SnO_2$ | 2.00 | 11/3 | 600 | 20 | (1 × 0.5 × 20) | 25 | Ar |
| 5 | 75 wt % $LiBH_4$ + 25 wt % $TiCl_3$ | 2.00 | 11/3 | 600 | 20 | (1 × 0.5 × 20) | 25 | Ar |

As seen in reference to FIG. 4, the sample 1 of $LiBH_4$ 75%-$TiO_2$ 25% desorbs 8.5 wt %, 5.0 wt %, and 1.5 wt % hydrogen at 400° C., 300° C., and 200° C. respectively. It is expected that the lower dehydriding temperature and the higher dehydriding capacity are achievable through the optimization of the catalysts, catalyst loading and synthesis parameters.

As seen in reference to FIG. 5, sample 1 of $LiBH_4$ 75%-$TiO_2$ 25% has a unique crystal structure that differs from the original $LiBH_4$.

As seen in reference to FIG. 1, five specific catalysts (samples 1-5) have been seen to be effective in reducing dehydrating temperatures and producing a reversible hydrogen storage material. It is recognized and understood that the operative amounts of catalysts and the conditions for combining the catalysts with the borohydrides have not been optimized. While 25 wt % loadings of various catalysts have proven effective, as various catalysts are evaluated and optimized, it is believed that catalyst amounts as low as about 10 wt % to as high as about 50 wt % may offer optimal results. It is well within the skill level of one having ordinary skill in the art to use routine experimentation to determine the preferred and optimal amounts of catalysts using the techniques described herein and thereby determine the most effective weight percent amounts of catalyst.

Similarly, the equipment and resulting processes used to carry out the ball milling process as well as the Temperature Programmed Desorption (TPD) parameters can also be refined. Again, it is believed that variations in the ball milling process, such as the parameters of ball number, size, weight, and ball milling speed may be varied to achieve the desired results.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A rehydridable hydrogen storage material consisting essentially of:
    an alkali borohydride containing between about 10 wt % to about 50 wt % of a catalyst selected from the group consisting of $TiO_2$, $ZrO_2$, $SnO_2$, $TiCl_3$, transition metal oxides, other metal and non-metal oxides, halides, and combinations thereof, said alkali borohydride and said catalyst being milled together;
    wherein said resulting hydrogen storage material has a hydrogen release point of at least about 150° C. and which releases at least 8 wt % hydrogen when raised to 450° C.

2. A hydrogen storage material according to claim 1 wherein said hydrogen storage material has a second dehydrating capacity of between about 6 wt % to about 9 wt %.

3. A hydrogen storage material according to claim 1 wherein said hydrogen storage material may be rehydrided and exhibits a second dehydriding capacity of between about 6 wt % to about 9 wt %.

4. A process of forming a rehydridable hydrogen storage material consisting essentially of the steps of:
    providing a quantity of an alkali borohydride;
    mixing with the alkali borohydride a catalyst in a range of between about 10 wt % to about 50 wt % selected from the group consisting of $TiO_2$, $ZrO_2$, $SnO_2$, $TiCl_3$, transition metal oxides, halides, and combinations thereof;
    wherein, said resulting hydrogen storage material has a hydrogen release point beginning at about 150° C. and which releases at least 8 wt % hydrogen when raised to 450° C.

5. The process according to claim 4 wherein said mixing step is through a ball milling process.

6. The process according to claim 4 wherein said hydrogen storage material may be rehydrided and with a second dehydriding capacity of between about 6 wt % to about 9 wt %.

7. The process according to claim 6 wherein when said hydrogen storage material is rehydrided, said hydrogen storage material thereafter reversibly releases at least about 9 wt % hydrogen.

8. The process according to claim 4 wherein said alkali borohydride is lithium borohydride.

9. A hydrogen storage material consisting essentially of:
    lithium borohydride; and,
    between about 10 to about 50 wt % of a catalyst selected from the group consisting of $TiO_2$, $ZrO_2$, $SnO_2$, $TiCl_3$, transition metal oxides, other metal and non-metal oxides, halides, and combinations thereof;
    wherein said resulting hydrogen storage materials has a hydrogen release point of at least about 150° C. and which exhibits a second dehydriding capacity of between about 6 wt % to about 9 wt %.

* * * * *